United States Patent

[11] 3,554,081

| [72] | Inventor | William B. Haley |
| | | Davenport, Iowa |
| [21] | Appl. No. | 817,077 |
| [22] | Filed | Apr. 17, 1969 |
| [45] | Patented | Jan. 12, 1971 |
| [73] | Assignee | Chicago Rawhide Manufacturing Co. |
| | | Chicago, Ill. |
| | | a corporation of Illinois |

[54] SEAL UNIT AND METHOD OF MANUFACTURING
11 Claims, 8 Drawing Figs.

[52] U.S. Cl. ...................................................... 90/11,
82/11; 90/15, 90/20
[51] Int. Cl. ........................................................ B23b 3/34
[50] Field of Search ............................................ 90/163, 20,
15, 11, 11.3, 174; 82/11, 902; 269/(Inquired);
279/(Inquired); 77/(Inquired)

[56] References Cited
UNITED STATES PATENTS
| 2,372,374 | 3/1945 | Goddard | 90/20 |
| 2,389,201 | 11/1945 | Lawrenz | 90/20 |

*Primary Examiner*—Gil Weidenfeld
*Attorney*—Greist, Lockwood, Greenawalt & Dewey ABSTRACT: An apparatus and method for cutting grooves from the body portion of a seal assembly which includes a casing element and a resilient seal body. The apparatus includes a combination rotatable spindle and fluid-operated clamping unit for holding the seal and supporting it along all the exterior surfaces thereof except the surface desired to be cut, and means for moving the spindle and holder into a position such that the portion thereof holding the seal surrounds a cutting tool. A rotary cutting tool which may be moved radially outwardly from its axis of rotation is provided to cut circumferentially extending grooves or slots defining plural sealing lips in the inwardly directed portions of the seal body. Preferably, the holder and the cutting tool are rotated in opposite directions, and means is provided to facilitate simple and rapid loading of the seals into the holder. The method of forming a seal by using the apparatus is also described.

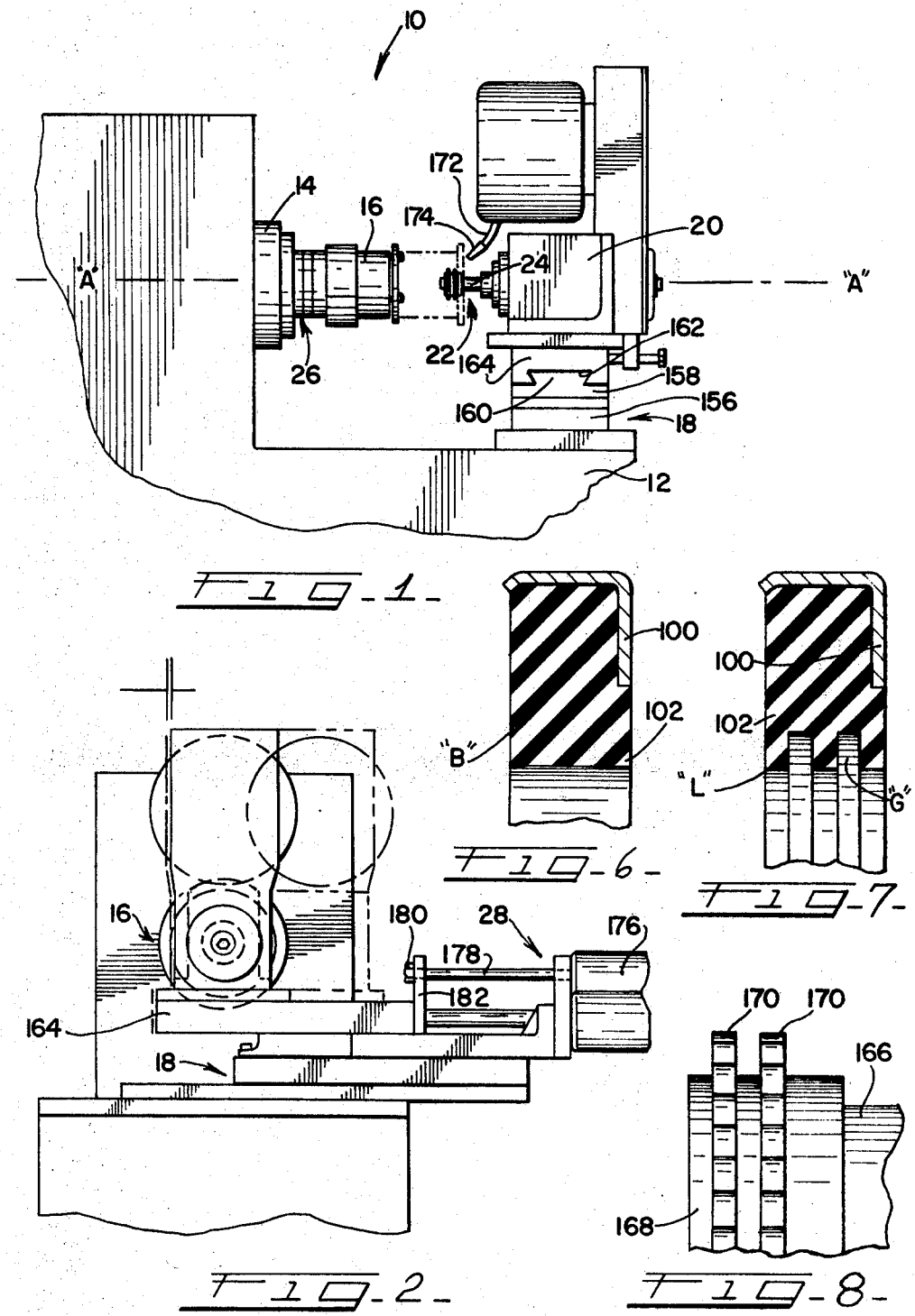
PATENTED JAN 12 1971    3,554,081
SHEET 1 OF 2
INVENTOR
WILLIAM B. HALEY

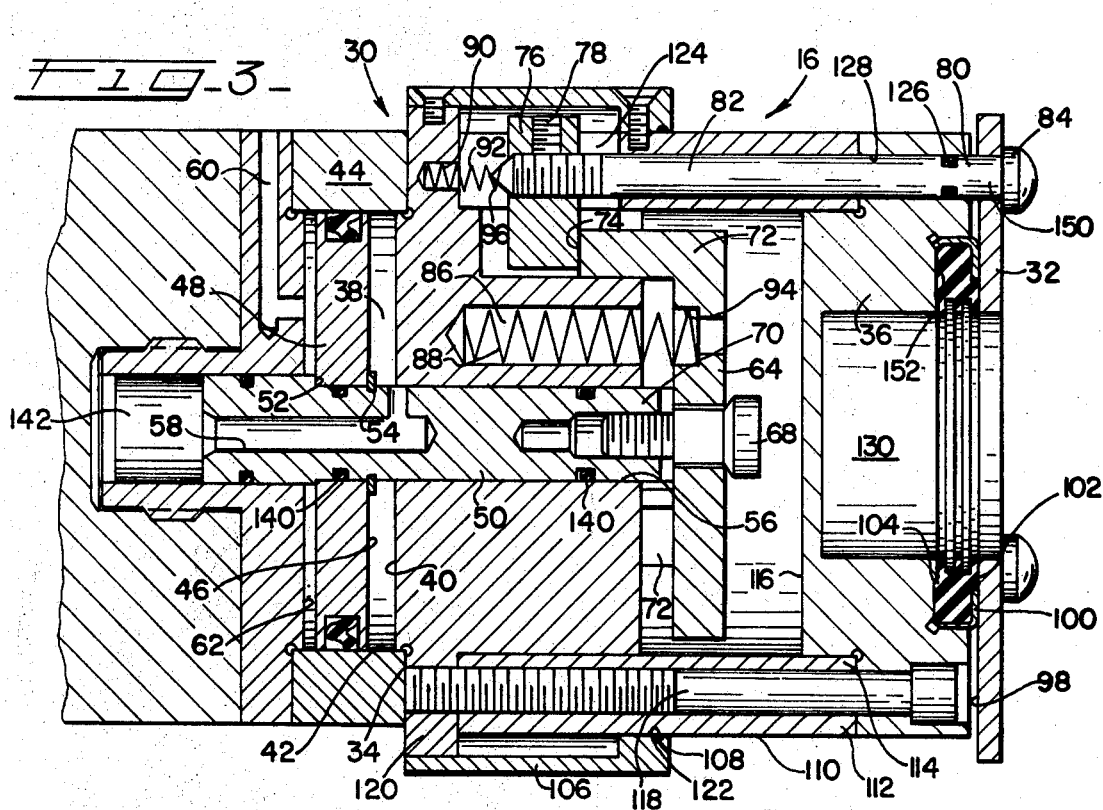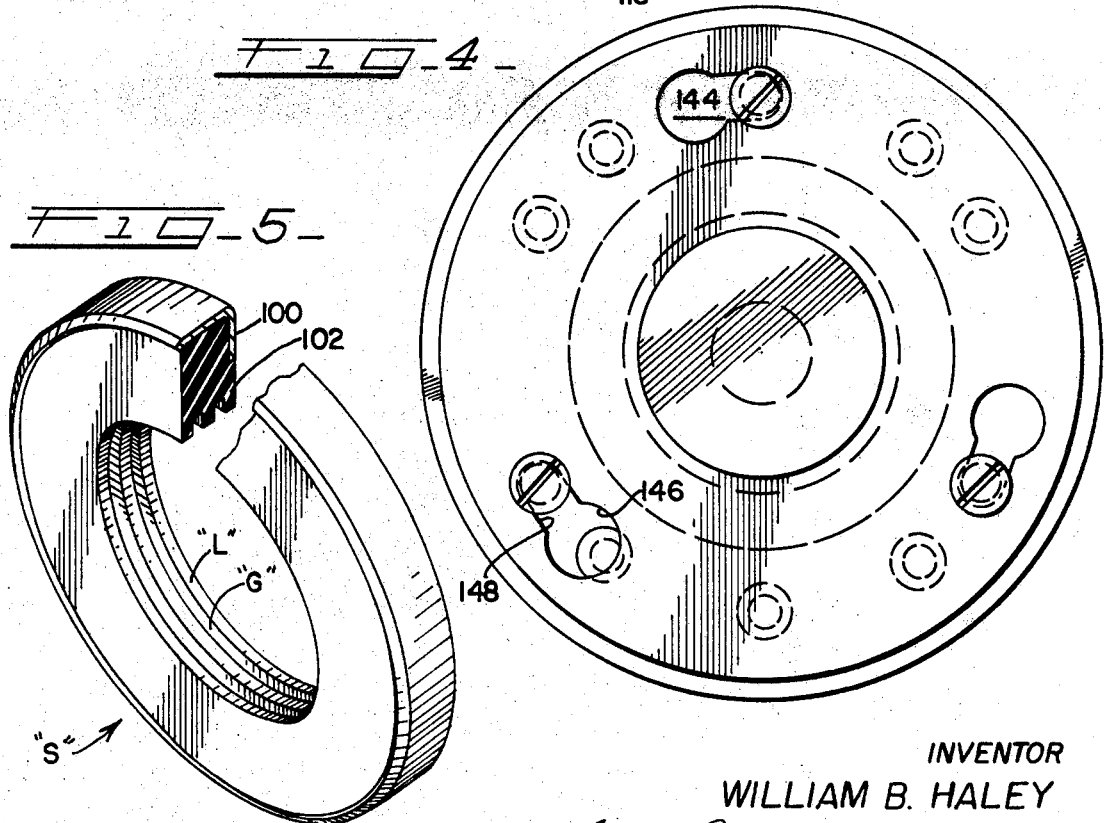

3,554,081

SEAL UNIT AND METHOD OF MANUFACTURING

BACKGROUND OF THE INVENTION

In the field of fluid sealing, multilip seals are in common use, and have a number of purposes and advantages. These seals generally include a body portion having a plurality of lips or ribs extending radially inwardly or outwardly therefrom, and the lips are commonly spaced apart by a distance of about the same order as the thickness of each lip or rib portion. In some cases, these seals are referred to as including grooves, reentrants or cutout portions extending radially inwardly or outwardly of the body portions thereof to define such sealing lips.

Since it is customary to form these seals by a molding operation rather than by lamination, for example, molding these seals in a reliable, accurate and economical manner has presented several problems.

The reason for this is that whereas such seals are normally required to be accurately and precisely made, they should also be able to be furnished at low cost, and should be susceptible of mass production in a variety of sizes and shapes.

It is well known, however, that is is not easy to make a seal or other like part having a plurality of so-called undercut surfaces. Making such units may often require split molds or the like, or necessitate straining or deforming the parts in removing them from the mold. In addition, the shape of the interlocking surfaces formed by molding requires that a mold release agent be uniformly effective, in order to prevent portions of the seal, particularly portions of thin cross section, from tearing away from the seal body during release of the part from the mold. The problem is particularly troublesome where the lips or grooves are formed in communication with a radially inner surface of the seal body. Since, in ordinary mass production of seal units multicavity molds are used, still further problems are presented, since every cavity must perform uniformly with respect to heat transfer, release, etc. in use, and multicavity molds having portions of thin cross section are extremely expensive, and undesirably fragile.

Since the portion of the seal which contains the lips or grooves is normally unsupported on both axial ends thereof, in order to allow the lips to perform their function of deflecting into sealing engagement with portion of a relatively movable part, and since multilip seals have been flexible enough to deflect to accommodate dimensional variations or radial run out, and has not heretofore been found practical to form the grooves or lips by a cutting process.

However, it has been discovered that such seal units may be manufactured with the desired qualities if they are held for cutting so that the combination of the holder unit and the cutting tool serves to prevent movement of any substantial portion of the seal body to a position away from the cutting tool during the time the tool is engaged with the work, that is, the seal body itself.

Accordingly, it is an object of the present invention to provide a novel method for forming fluid seals having plural lips defined by radially extending grooves.

A further object is to provide a seal unit made by a cutting method which includes simultaneously cutting grooves in a seal body in a single operation.

A still further object is to provide a method of making seals which includes the steps of supporting a seal against movement and deflection during the time it is engaged with a cutting tool to prevent movement of the seal body during the cutting operation.

Another object is to provide a method wherein the sealing lips may be shaped by the cutting tool, so that seals having a variety of sealing lip shapes may be made in the same mold.

A still further object is to provide an apparatus for receiving a seal which may be manually or mechanically inserted therein, and which includes means for clamping the seal in a desired position, positioning the seal in registry with a cutting tool, rotating the seal, and moving a cutting tool radially of its axis of rotation to cut plural grooves in a seal element simultaneously.

A still further object is to provide an apparatus which is economical, simple, and effective in use, and which serves to hold a seal so that a flexible body portion thereof may be cut by a cutting tool in a precise and accurate manner.

Another object is to provide a seal-forming apparatus in which the seal is desirably supported in relation to a given pressure rather than a given dimension, so that dimensional variations of the seal blank will not affect the accuracy of the seal formed by the cutting method.

Another object is to provide a seal-forming apparatus which is easily loaded and unloaded, and which facilitate manufacture of seals by the method of the invention.

These and other objects of the invention, including those inherent therein, are attained by providing an apparatus which includes a rotatable seal holder having means for receiving a seal, means for clamping the seal in tight supporting engagement, for moving it into position of registry with a rotary cutting tool and for moving a cutting tool radially outwardly from its axis of rotation into engagement with a portion of the body of the seal held within the holder while the tool is rotated to cut plural grooves defining a plurality of sealing lips in the seal body.

The manner in which this invention accomplishes these objects, and others which are inherent therein, will become more fully apparent when the invention is considered in connection with a description of a preferred embodiment thereof, set forth in the specification, and defined in the claims and shown in the accompanying drawings, in which like reference numerals indicate corresponding parts throughout.

FIG. 1 is a fragmentary side elevational view of the seal holder unit and cutting tool assembly of the present invention;

FIG. 2 is a fragmentary front elevational view, showing the seal forming apparatus of the invention, including the means for moving the cutting tool unit;

FIG. 3 is a vertical sectional view, on an enlarged scale, of the combination rotatable spindle and clamping unit of the present invention;

FIG. 4 is an end elevational view of the combination unit shown in FIG. 3;

FIG. 5 is a perspective view, partly in section and with portions broken away, showing a seal unit made by the method of the present invention;

FIG. 6 is a vertical sectional view of a seal blank of the invention; on an enlarged scale;

FIG. 7 is a vertical sectional view of a portion of the finished seal; and

FIG. 8 is an enlarged side elevational view of a portion of the cutting tool of the invention.

DESCRIPTION OF THE PREFERRED EMBODIMENTS OF THE INVENTION

Referring now to the drawings in greater detail, FIGS. 1 and 2 shows a combination seal-manufacturing apparatus 10 which includes a frame 12 having mounted thereon a spindle support assembly 14, combination rotatable spindle and clamping unit 16 for holding a seal unit "S", and a cutting tool table 18, which supports a motor 20 and a cutting tool assembly 22 thereon. As shown in the phantom lines, the combination unit 16 rotates about an axis A as does the shaft 24 which supports the cutting tool assembly 22. The seal holder assembly 16 may be extended and retracted axially along this rotational axis A by a known feed mechanism 26 forming a part of the spindle support assembly 14. Such a feed mechanisms are well known to those skilled in the art, and, forming no essentially novel part of this invention, will not be described in further detail herein. FIG. 2 shows the cutting tool assembly radial feed mechanism 28 associated with the cutting tool table 18, and although this unit will be referred to in greater detail herein, it does not per se form a novel part of the present invention.

Referring now to FIG. 3. the seal holder assembly 16 is shown to include a principal body portion 30 a removable cover element 32, and a hub 34 supporting a holder head 36.

The assembly 16 further includes an operating cylinder 38 defined by an end wall 40 of the hub 34, an inwardly facing cylindrical wall portion 42, of a cylinder sleeve 44, and an opposite end wall 46. A piston 48 is received within the sleeve 44 and is maintained in fixed relation to a piston rod 50 by a shoulder 52 and a clip 54 disposed at opposite axial ends of the piston 48. The rod 50 is so sized as to slide axially within a center bore 56 of the hub 34, and moves to the left as shown in FIG. 3 when a pneumatic or other fluid pressure is supplied to the operating cylinder 38 through the passageway 58 in the piston rod 50. A vent passage 60 provides communication between the portion 62 of the cylinder 38 on the low-pressure side of the piston 48 and the atmosphere.

Means for equalizing axial movement of the cover element 32 is provided in a form of the yoke 64 affixed by fastener means such as a capscrew 68 to the axial end portion 70 of the piston rod 50. The yoke 64 includes three axially extending arm portions 72 terminating in axially facing surfaces 74 which engage three equally spaced draw bar extensions 76 which are internally threaded and held fixed against rotation, as by setscrews 78, to the externally threaded inner end portions 80 of the drawbars 82 which have enlarged head portions 84 disposed on the outer ends thereof.

One or more cylindrical bores 86 are provided in the hub 34 for receiving springs 88 which bias the yoke 64 axially to the right as shown in FIG. 3, while additional cylindrical bores 90 are provided in axial alignment with the ends 80 of the drawbars 82 for receiving helper springs 92 which also bias the drawbars 82 to the right, as in FIG. 3. The springs 88 have one end thereof received in a cylindrical cut out 94 in the yoke 64, while the end portion 96 of the spring 92 opposite the end disposed in the bore 90 engages the end portion 80 of the drawbars 82 directly. As a result of the provision of the springs 88, 92, the yoke 64, and the parts operatively associated therewith, including the piston rod 50 and the drawbars 82, are normally biased to the right, or to an open or unlocked position of the cover element 32, while fluid pressure applied within the cylinder 38 overcomes the force of the springs 88, 92 and forces the piston 48, the rod 50, the yoke 64 and the drawbars 82 to the left, serving to draw the cover plate 32 into a position with the inner surface 98 thereof closely overlying the flange portion 100 and the radially extending face 102 of the body 104 of a seal assembly S, so as to confine the seal body 104 from movement or deflection under compression, except radially inward movement.

In a preferred form of the invention, the hub 34 is covered on an exterior portion thereof by a sleeve 106 having a flange portion 108 thereof surrounding a mounting cylinder 110, an end portion 112 of which is accommodated within a circumferentially extending groove 114 in the rear face 116 of the holder head 36. A plurality of fastening means, such as capscrews 118 or the like, extend through and fasten the holder head 36 to the cylinder 110 and to an outer flange 120 portion of the hub 34. O-rings 122 are provided to insure that there is a liquid tight seal between the sleeve 106, the flange 108, and the cylinder 110. The cylinder 106 is provided not only to allow for relative movement of the extension 76 within the guideways 124, but also to prevent entrance of fluid into the interior of the seal holder unit 16. The O-rings 126 associated with each draw bar 82 allow for axial movement of the draw bar 82 within the bores 128, and also exclude fluid from the interior of the holder assembly 16.

Plural sets of O-rings 140 are provided to prevent fluid leakage from the cylinder 38, from the pilot opening 142 or the center bore 56 of the assembly 16, during movement of the piston 48, rod 50 and parts associated therewith. The recess 130 in the head 36 provides an opening behind the seal assembly S where cuttings or shavings from the seal which are being formed may be directed as they are being formed, by directing a jet of water at the portion of the seal body 104 which is being engaged by a portion of the cutting tool assembly 22.

In the preferred form of the invention, the entire seal holder assembly 16 is preferably removably locked to a rotatable member R which may be moved axially, by engagement of locking portions 132 of such member with a rib 134 or the like disposed on the cylindrical extension 136 forming an axially outwardly extending portion of the end plate 138 of the assembly 16.

Referring now to FIG. 4, an end view of the movable cover element 32 is shown to include a plurality of keyhole slots 144, each having an enlarged partial circular end 146 and a reduced width opposite end portion 148. The larger end 146 is sized so as to be slightly larger than the head 84 of the drawbars 82, and the reduced width portion 148 is sized so as to provide a slight working clearance between its inner edge and the shank portion 150 of the drawbar 82 therefor.

In use, the cover element 32 may be removed by rotating it a few degrees to the right, as shown in FIG. 4, when the axially inwardly directed force on the drawbars 82 is released, and removing the plate by allowing the heads 84 to pass through the openings 144. In this manner, a seal assembly S may be removed from the groove 152 in the end of the holder head 36. Another seal assembly S may be rapidly inserted in the groove 152, which is larger in diameter than the outside diameter of the seal assembly S by a working clearance of a few thousandths inch. The cover element 32 may then be replaced and locked in position by rotating it slightly to the left in the orientation of FIG. 3. Application of fluid pressure to the cylinder 38 moves the drawbars 82 and the parts associated therewith to the left as shown in FIG. 3, and this clamps the seal in position of use where it is held until the cutting operation to be described in detail hereafter is performed. Indexing the cover element 32 so that the openings 138 register with the heads 84 of the drawbars 82 is facilitated by the oval or fillister shape of the heads 84. Manipulation of the cover element 32 is facilitated by imparting a knurled texture to the radially outermost surface 154 thereof.

Referring now to FIG. 1, the cutting tool table 18 is shown in greater detail to comprise, a base portion 156, a lower slide way 158 having an upwardly extending guide member 160 of generally trapezoidal configuration extending into a reentrant portion 162 in the slide member 164 in a guiding relation thereto. The motor 20 includes a cutting tool assembly 22 disposed on an axial end portion 166 of the shaft 24. The cutting tool assembly 22, which is shown in an enlarged, fragmentary view in FIG. 8, includes a cylindrical body portion 168 and a plurality of blades 170 extending outwardly therefrom. As shown in FIG. 8, the radially outer end portions of the blade 170 is rectangular in cross section; however, the blade 170 may have end portions which are rounded in cross section, to cut grooves of such shape in the seal body. A jet pipe unit 172 is disposed with an end portion 174 thereof directed toward the outer ends of the cutting blades 170 so that, in use, water, or a mixture of air and water, may be directed at the seal assembly S and into the recess 130, for cooling and lubricating the seal assembly S and removing scrap material therefrom during the cutting operation.

Referring now to FIG. 2, it is shown that the slide 164 which is mounted for movement over the guide member 160 of the base 158 may be moved radially of the axis A of the shaft 24, this is, to the left and right as shown in FIG. 2, by the application of fluid force to one side of the interior of a cylinder 176 which contains a piston (not shown), to operate a rod 178 attached by fasteners 180 to a flange 182 extending upwardly from the slide 164. The cylinder 174 is of conventional construction and is preferably double acting, so that the slide 164 may be moved positively in either direction.

The operation of the seal manufacturing apparatus of the invention will now be described, assuming that the groove 152 in the holder 16 which receives a seal assembly S is empty, and the apparatus is in the position shown in FIGS. 1 and 2. The motor 20 and the parts associated therewith, including the cutting tool assembly 22 are moved to the right as shown in the phantom lines of FIG. 2, by applying a pressure within the cylinder 176 to cause the operating rod 178 to move the slide 164 to such withdrawn position. This exposes the front face portion of the seal holder assembly 16 so that access may be had thereto from the front. With the holder 16 in the position shown in solid lines in FIG. 1, that is, axially withdrawn to the left, pressure within the cylinder 38 is lowered, and the springs 88, 92 move the drawbars 82 to an unlocked position, that is, to the right as shown in FIG. 3. This permits the cover plate 32 to be rotated clockwise (FIG. 4) for unlocking and removal from the end of the holder 16.

Thereupon, an operator selects a seal assembly blank B (FIG. 6) having a body 104 which is solid in cross section, a front wall portion 102 and a radially inwardly extending front flange 100. The seal blank B is then placed within the groove 152 in the holder head 36 as shown in FIG. 3. The cover plate 32 is then indexed into position, and rotated counter clockwise so that the shank portions 150 of the drawbars 82 are held in place within the reduced width portions 148 of the slots 144. Thereupon, pressure is applied within the cylinder 38, and the inner face 98 of the cover plate 32 is moved into engagement with the flange 100 and the front face 102 of the seal blank B. This force therefore serves to confine all portions of the seal blank B except the radially inwardly facing portion thereof, so that it cannot be moved or deformed axially or radially outwardly. When the seal blank B is thus held, the table 18 is returned to the left to a position of use with the center line thereof in axial alignment with the center line A of the holder 16. The holder is then extended axially outwardly (to the right in FIG. 1), and rotated in one direction at a rapid rate. The motor 20 rotates the shaft 24 in an opposite direction, so that the blades 170 are rotating rapidly. A cut is then made in the body portion 104 of the seal blank B in the form shown in FIG. 7, by traversing the table 18 radially outwardly of the axis A a distance equal to the depth of the cut, (FIG. 2) while cooling water or other fluid is directed to the seal from the pipe 172. When this cycle is completed, the table 18 is transversed to the right, the holder 16 is withdrawn, pressure on the cover plate 32 is lowered and the completed seal S having plural grooves G therein defined by sealing lips L is removed from the holder so that the operation may be subsequently repeated in the same manner.

In the illustrated embodiments, the cutting blades 170 are shown as being rectangular in cross section, but it will be understood that they might well be in other conventional shapes, such as having rounded outer edge portions, sharply pointed tips, or the like. A seal S has been described having a flange portion 100 and a body 104 of the shape illustrated, including two grooves G defined by three lips L. However, it is understood that the exact shapes of the seal body 104, the flange 102, etc. do not form an essential part of the present invention, and seals having bodies or casing portions of different sizes or shapes may be made by the process and apparatus of the invention. In particular, it is common for plural lip seals of the type with which this invention is concerned to include four, six, or eight or more lips, each defined by grooves or end walls. According to the present invention, any number or configuration of grooves may be cut by providing an appropriate size and cutting tool.

The operation of the means for traversing the slide 164 and the parts associated therewith has been illustrated in a preferred form, but it is clear that the cut might be made by relative motion in directions other than that shown, or by radial movement of the holder 16 in relation to the axis A. Pneumatic operation of certain components has been illustrated, but it is clear that these components might be actuated hydraulically, mechanically, or otherwise.

It will thus be seen that the present invention provides a novel seal, and a novel seal manufacturing apparatus and method, having a number of advantages and characteristics, including those pointed out herein and others which are inherent in the invention.

I claim:

1. An apparatus for forming a seal unit, comprising in combination, a seal holder assembly and a movable cutting tool assembly, said holder including means for supporting an elastomeric seal along a plurality of surfaces thereof and maintaining it in a compressed condition while exposing only the surface thereof to be engaged by a cutting tool, means for rotating said holder, and fluid operated means for releasably gripping and maintaining a compressive force on said seal unit along one face thereof and for releasing said force to release said seal, a cutting tool mounted on said cutting tool assembly, means for rotating said cutting tool about a given axis of rotation, and means for moving said cutting tool radially outwardly of said axis of rotation thereof to engage a portion of said cutting tool with said exposed surface of said seal.

2. An apparatus as defined in claim 1 in which said means for releasably gripping and maintaining said force on said seal comprises a cover plate element removably held in place over an axially facing end portion of said holder.

3. An apparatus as defined in claim 1 in which said fluid operated means for releasably gripping said seal includes a seal engaging portion and a piston portion operatively associated therewith, and in which said holder assembly includes a cylinder therein for accommodating said piston in substantially fluid tight relation and for allowing axial movement of said piston within said cylinder.

4. An apparatus as defined in claim 1 in which said means for releasably gripping said seal includes an element for engaging a face of said seal, a plurality of drawbars adapted to exert an axially directed force on said element, means for maintaining said drawbars in a parallel relation to the axis of said holder, and means connecting said drawbars to a common axially movable member for simultaneous operation thereof.

5. An apparatus as defined in claim 1 in which said holder includes a cylinder adapted to receive fluid therein, in which a piston is disposed within said cylinder for axial movement therein, in which said means for releasably gripping said seal include a cover element operatively associated with said piston for movement therewith, and in which means are provided for normally urging said cover element in one axial direction and wherein fluid pressure in said cylinder will urge said cover element in an opposite axial direction.

6. An apparatus as defined in claim 1 in which said means for releasably gripping said seal is a cover element having a central aperture therein which is of substantially the same inside diameter as the inside diameter of the seal to be held in said holder, and in which further apertures are provided for allowing, in one position of said cover element, engagement between said means for maintaining said force on said seal, and in another position thereof, for allowing removal of said cover element from said last named means.

7. An apparatus as defined in claim 1 in which means are provided for exposing a portion of said seal held in said holder to contact with cleaning and cooling fluid, and in which means are also provided for isolating the other working parts of said holder from said fluid.

8. An apparatus as defined in claim 1 in which a cylinder is disposed within a portion of said holder, a piston is mounted for reciprocation in said cylinder, a piston rod and yoke assembly is disposed in operative association with said piston, in which drawbars are mounted for movement with said yoke and rod, and in which a cover element is provided for engagement by said drawbars, whereby fluid pressure in said cylinder causes said cover element to engage and hold said seal disposed within an end portion of said holder for cutting by said cutting tool.

9. A method of making a composite seal assembly which includes supporting a seal unit having a rigid casing element portion and an elastomeric seal body portion within a holder, maintaining said seal body portion in a compressed condition on a plurality of surfaces so as to prevent axial distortion and radially outward distortion thereof during a cutting operation and to keep said seal unit in a position which is fixed in relation to said holder, rotating the seal unit thus held about a given axis of rotation, and cutting radially extending grooves in said seal body by moving a rotating cutting tool radially outwardly from a given axis of rotation and into cutting engagement with a radially inwardly facing surface portion of said seal body portion to form a plurality of grooves at least partially defining a plurality of sealing lips in said seal body portion.

10. A method as defined in claim 9 in which said seal is supported at least in part by releasably engaging a radially extending surface portion thereof under fluid pressure.

11. A method as defined in claim 9, which further includes the step of rotating said cutting tool in one direction and rotating said holder in another direction at least during the time said tool and said seal held in said holder are in cutting engagement with each other.